(12) United States Patent
Han et al.

(10) Patent No.: US 9,489,038 B2
(45) Date of Patent: Nov. 8, 2016

(54) ELECTRONIC APPARATUS AND METHOD FOR CONTROLLING THE SAME

(71) Applicant: SAMSUNG ELECTRONICS CO., LTD., Suwon-si (KR)

(72) Inventors: Sang-jin Han, Gunpo-si (KR); Yong-hwan Kwon, Seongnam-si (KR); Jung-geun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 13/687,771

(22) Filed: Nov. 28, 2012

(65) Prior Publication Data

US 2013/0169525 A1    Jul. 4, 2013

(30) Foreign Application Priority Data

Dec. 30, 2011    (KR) .................. 10-2011-0147512

(51) Int. Cl.
| | |
|---|---|
| *G06F 3/01* | (2006.01) |
| *G06F 3/16* | (2006.01) |
| *G10L 15/22* | (2006.01) |
| *G06F 9/44* | (2006.01) |
| *H04N 21/422* | (2011.01) |

(52) U.S. Cl.
CPC .............. *G06F 3/01* (2013.01); *G06F 3/017* (2013.01); *G06F 3/167* (2013.01); *G06F 9/4446* (2013.01); *G10L 15/22* (2013.01); *H04N 21/42203* (2013.01); *H04N 21/42222* (2013.01); *G10L 2015/223* (2013.01)

(58) Field of Classification Search
CPC ...... G06F 3/167; G06F 3/017; G06F 3/0482; G06F 3/04895; G06F 3/04842; G06F 9/4446; G06F 3/01; H04N 21/42203; H04N 21/431; H04N 21/4394; H04N 5/44543; H04N 21/42222; H04N 5/4403; H04N 5/44513; G10L 15/22; G10L 2015/223; H04M 2250/74
USPC .................. 345/156–173; 704/246, 275, 276
See application file for complete search history.

(56) References Cited

U.S. PATENT DOCUMENTS

| | | | |
|---|---|---|---|
| 6,762,692 B1 | 7/2004 | Mingot et al. | |
| 7,801,730 B1 * | 9/2010 | Miyazaki et al. | ............ 704/275 |

(Continued)

FOREIGN PATENT DOCUMENTS

EP    1207516 A1    5/2002

OTHER PUBLICATIONS

Communication, dated Jun. 26, 2013, issued by the European Patent Office in counterpart European Application No. 12198524.6.

(Continued)

*Primary Examiner* — Hong Zhou
(74) *Attorney, Agent, or Firm* — Sughrue Mion, PLLC

(57) ABSTRACT

An electronic apparatus and a control method thereof are provided, which displays first voice guide information indicating voice commands available to control the electronic apparatus, and if a command to control an external device connected to the electronic apparatus is received, changes the first voice guide information and displays second voice guide information to indicating voice commands available to control the external device.

19 Claims, 9 Drawing Sheets

(56) References Cited

U.S. PATENT DOCUMENTS

| | | | | |
|---|---|---|---|---|
| 8,032,382 | B2* | 10/2011 | Yamamoto et al. | 704/275 |
| 2005/0027538 | A1* | 2/2005 | Halonen et al. | 704/275 |
| 2005/0114140 | A1* | 5/2005 | Brackett et al. | 704/270 |
| 2007/0033055 | A1* | 2/2007 | Tanaka | 704/275 |
| 2007/0247794 | A1* | 10/2007 | Jaffe et al. | 361/681 |
| 2008/0049905 | A1* | 2/2008 | Seo | 379/88.03 |
| 2009/0005026 | A1* | 1/2009 | Lunsford et al. | 455/418 |
| 2009/0164113 | A1* | 6/2009 | Kang | 701/200 |
| 2009/0262001 | A1* | 10/2009 | Haga et al. | 341/176 |
| 2010/0315563 | A1* | 12/2010 | Park | H04N 21/4108 348/734 |
| 2012/0259639 | A1* | 10/2012 | Yeh et al. | 704/270 |
| 2013/0073293 | A1* | 3/2013 | Jang et al. | 704/275 |

OTHER PUBLICATIONS

Griffin Technology: "Griffin and Dijit Announce Android-Compatible Beacon Universal Remote Control System", Nov. 8, 2011, XP002698565, http://web.archive.org/web/20111112141722/http://www.griffintechnology.com/press/release/griffin-and-dijit-announce-android-compatible-beacon-universal-remote-control-system, pp. 1-4.

Communication, Issued by the European Patent Office, Dated Jan. 12, 2015, in counterpart European Application No. 12 198 524.6.

Communication dated Sep. 22, 2015 issued by the European Patent Office in counterpart European Application No. 12198524.6.

Communication (Decision to Refuse) dated May 20, 2016, issued by European Patent Office in counterpart European Application No. 12 198 524.6.

* cited by examiner

ELECTRONIC APPARATUS AND METHOD FOR CONTROLLING THE SAME

CROSS-REFERENCE TO RELATED APPLICATIONS

This application claims priority from Korean Patent Application No. 10-2011-0147512, filed on Dec. 30, 2011, in the Korean Intellectual Property Office, the disclosure of which is incorporated herein by reference in its entirety.

BACKGROUND

1. Field

Apparatuses and methods consistent with exemplary embodiments relate to controlling an electronic apparatus and a method for controlling the same, and more particularly, to an electronic apparatus controlled in accordance with a user's voice or motion and a method for controlling the same.

2. Description of the Related Art

Various types of electronic apparatuses have been developed and distributed thanks to the advancement in the field of electronics. Against this backdrop, home users are now provided with various types of electronic apparatuses including televisions (TVs). These electronic apparatuses for home use have a variety of functions to meet the customer's increasing demands. For example, TVs now can access the Internet and provide Internet service. Further, users can view numerous digital broadcast channels on TVs.

Thus, it is increasingly necessary for the users to be familiar with numerous and increasing methods of input to utilize the functions provided by the electronic apparatuses more efficiently. For example, the input may be made through remote control, mouse or touchpad.

However, it may be difficult to efficiently use all the functions provided by the electronic apparatuses with various input devices. For example, a remote control has to accommodate many buttons, if the remote control is the only device that is provided to control all the functions of the electronic apparatus. The problem is casual or novice users would not find it easy to handle such a remote control. In another example, if users are required to input choices through the menus displayed on the screen, it would be cumbersome for the users who have to check the complicated menu trees one by one until they find the right menu.

Accordingly, to provide an electronic apparatus which is controlled more conveniently and intuitively, technology based on voice and motion recognition has been developed. In a system to control electronic apparatuses using voice or motion recognition, a user interface (UI) is necessary to guide the user through the voice or motion recognition.

However, the conventional UI relating to voice or motion recognition is provided in the same form, irrespective of the executed applications or user preference. For example, irrespective of whether the electronic apparatus (e.g., TV) is connected to a set top box to perform the function of broadcast reception or connected to a DVD player to perform the function of playing back images, there is always the same form of UI provided to the user.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

One or more exemplary embodiments provide an electronic apparatus which can provide different sound or motion guide information depending on types and functions of external devices connected thereto, and a method for controlling the same.

According to an aspect of an exemplary embodiment, there is provided a method for controlling an electronic apparatus, the method including: displaying first voice guide information to inform a user of voice commands available to control the electronic apparatus, receiving a user's command to control an external device connected to the electronic apparatus, and in response to the received user's command, changing the first voice guide information and displaying second voice guide information to inform the user of voice commands available to control the external device.

The method may include searching a plurality of voice guide information stored in the electronic apparatus to find the second voice guide information that corresponds to the external device.

If the electronic apparatus is a television (TV), the first voice guide information may include at least one of a voice command regarding power control, a voice command regarding operating the external device, a voice command regarding a channel setting, and a voice command regarding a volume setting, and if the external device is one of a DVD player and a Blu-ray Disc (BD) player, the second voice guide information may include at least one of a voice command regarding power control of the external device, a voice command regarding operating the external device, and a voice command regarding a playback setting of the external device.

The method may include, if the first voice guide information is displayed, and if a user's voice command contained in the first voice guide information is received, controlling the electronic apparatus according to the user's voice command, and if the second voice guide information is displayed, and if a user's voice command contained in the second voice guide information is received, generating a control signal corresponding to the received user's voice command and transmitting the generated control signal to the external device.

The method may include, if the second voice guide information is displayed, and if a user's voice command corresponding to one of the voice commands included in the second voice guide information is received, generating a control signal corresponding to the received user's command, and wirelessly transmitting the generated control signal to a relay device to transmit to the external device.

The generated control signal may be transmitted to the relay device by using Bluetooth communication, and the relay device may convert the transmitted control signal into an infrared (IR) signal and transmit the converted IR signal to the external device.

The first and second voice guide information may each include an icon which indicates that the operation mode of the electronic apparatus is a voice control mode.

The first and second voice guide information may be displayed on a bottom of a screen on which content is displayed on the electronic apparatus.

The user's command may be a user's voice command input through a voice input unit to control an external device.

According to an aspect of another exemplary embodiment, there is an electronic apparatus is provided, which may include a voice input device which receives a user's voice command input, a display, and a controller which controls the display to display first voice guide information to inform a user of voice commands available to control the electronic apparatus, and if a user's command to control an external device connected to the electronic apparatus is received, changes the first voice guide information and displays second voice guide information to inform a user of voice commands available to control the external device.

The electronic apparatus may include a storage which stores a plurality of voice guide information, wherein the controller may search the plurality of stored voice guide information of the storage to find the second voice guide information corresponding to the external device.

If the electronic apparatus is a TV, the first voice guide information may include at least one of a voice command regarding power control, a voice command regarding operating the external device, a voice command regarding a channel setting, and a voice command regarding a volume setting, and if the external device is one of a DVD player and a Blu-ray Disc (BD) player, the second voice guide information may include at least one of a voice command regarding power control of the external device, a voice command regarding operating the external device, and a voice command regarding playback setting of the external device.

The electronic apparatus may include an external terminal input device which connects the electronic apparatus to the external device, wherein, if the first voice guide information is displayed, and if a user's voice command contained in the first voice guide information is received, the controller may control the electronic apparatus according to the user's voice command, and if the second voice guide information is displayed, and if a user's voice command contained in the second voice guide information is received, the controller may generate a control signal corresponding to the received user's voice command and transmit the generated control signal to the external device.

The electronic apparatus may include a network interface which performs communication with a relay device that communicates with the external device, wherein, if the second voice guide information is displayed, and if a user's voice command corresponding to one of the voice command included in the second voice guide information is received, the controller may generate a control signal corresponding to the received user's voice command, and wirelessly transmit the generated control signal to a relay device to transmit to the external device.

The generated control signal may be transmitted to the relay device by Bluetooth communication, and the relay device may convert the transmitted control signal into an infrared (IR) signal and transmit the converted IR signal to the external device.

The first and second voice guide information may each include an icon which indicates that the operation mode of the electronic apparatus is a voice control mode.

The first and second voice guide information may be displayed on a bottom of a screen on which content is displayed on the electronic apparatus.

The user's command may be a user's voice command input through a voice input device to control an external device.

According to another aspect of an exemplary embodiment, there is provided a method for controlling an electronic apparatus, the method including: displaying first motion guide information to inform the user of motion commands available to control the electronic apparatus, receiving a user's command to control an external device connected to the electronic apparatus, and in response to the received user's command, changing the first motion guide information and displaying second motion guide information to inform the user of motion commands available to control the external device.

According to another aspect of an exemplary embodiment, there is provided an electronic apparatus, including: a motion input device which receives a user's motion, a display, and a controller which controls the display to display first motion guide information to inform a user of motion commands available to control the electronic apparatus, and if a user's command to control an external device connected to the electronic apparatus is received, changes the first motion guide information and displays second motion guide information to inform the user of motion commands available to control the external device.

According to an aspect of another exemplary embodiment, there is provided a method for controlling an external device, the method including: receiving a user's command to control an external device connected to the electronic apparatus; and in response to the received user's command, displaying motion guide information to inform the user of motion commands available to control the external device.

According to an aspect of another exemplary embodiment, there is provided a method for controlling an external device, the method including: receiving a user's command to control an external device connected to the electronic apparatus; and in response to the received user's command, displaying voice guide information to inform the user of voice commands available to control the external device.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
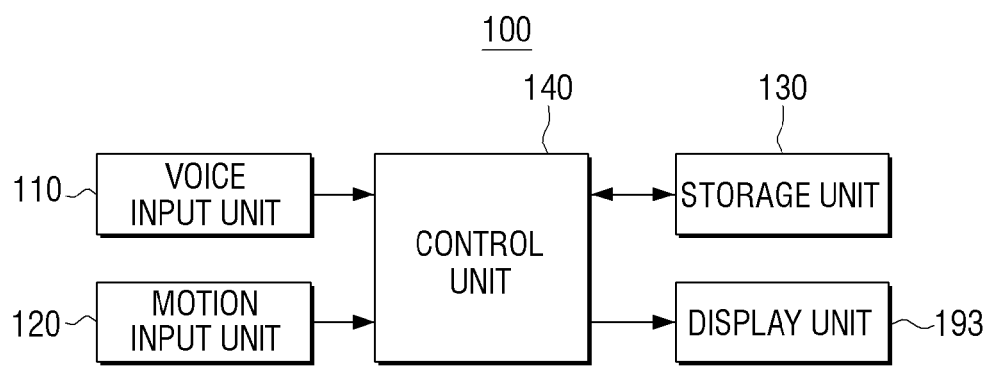
FIGS. 1 to 3 are block diagrams of an electronic apparatus according to various exemplary embodiments.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, wellknown functions or constructions are not described in detail since they would obscure the exemplary embodiments with unnecessary detail.

FIG. 1 is a schematic block diagram of an electronic apparatus according to an exemplary embodiment.

Referring to FIG. 1, the electronic apparatus 100 may include a voice input unit 110 (e.g., a voice input device such as a microphone, etc.), a motion input unit 120 (e.g., a motion input device such as motion detecting camera, gyroscope, etc.), a storage unit 130 (e.g., a storage, memory, etc.), a control unit 140 (e.g., a controller, processor, etc.) and a display unit 193 (e.g., a display, etc.). The electronic apparatus 100 may be implemented as a TV, a set-top box, a PC or a digital TV or mobile phone, but not limited thereto.

The voice input unit 110 receives a voice of a user when a user utters spoken commands, words, sentences, etc. The voice input unit 110 converts the input voice into an electric voice signal and outputs the signal to the control unit 140. By way of example, the voice input unit 110 may be implemented as a microphone. Further, the voice input unit 110 may be implemented together with the electronic apparatus 100 in a single device, or provided separately. If separately provided, the voice input unit 110 may be connected to the electronic apparatus 100 in a wired manner or via a wireless network.

The motion input unit 120 receives an image signal of a user's photographed motion (e.g., successive frames) and provides the same to the lens and the image sensor. By way of example, the motion input unit 120 may be implemented as a camera unit 120 which includes a lens and an image sensor. Further, the motion input unit 120 may be provided integrally with the electronic apparatus 100, or provided separately. If provided separately, the motion recognition unit 120 may connect to the electronic apparatus 100 in a wired manner or via a wireless network.

The storage unit 130 may store various data and programs to drive and control the electronic apparatus 100. The storage unit 130 may also store a voice recognition module to perceive or recognize voice input through the voice input unit 110 and a motion recognition module to perceive or recognize motion input through the motion input unit.

The storage unit 130 may include a voice database and a motion database. As used herein, the voice database refers to a database in which preset voices and voice tasks matching the preset voices are recorded. The motion database refers to a database in which preset motions and motion tasks matching the preset motions are recorded.

The display unit 193 may display an image corresponding to the broadcast signal received through the broadcast receiving unit. The display unit 193 may display image data (e.g., video) which is input through an external terminal input unit. The display unit 193 may also display voice guide information providing guidance on performing a voice task and motion guide information providing guidance on performing a motion task according to the control by the control unit 140.

The control unit 140 may control the voice input unit 110, the motion input unit 120, the storage unit 130, the display unit 193. The control unit 140 may include a central processing unit (CPU), a module to control the electronic apparatus 100, a Read Only Memory (ROM), and a Random Access Memory (RAM) to store data.

If a voice is input into or received through the voice input unit 110, the control unit 140 perceives the voice using the voice recognition module and the voice database. The voice recognition may be mainly categorized into an isolated word recognition method which perceives voice utterance based on isolated words, a continuous speech recognition method which perceives continuous sentences and a conversational voice, and a keyword spotting method in the hybrid form of the isolated word recognition method and the continuous speech recognition method, which detects and perceives predetermined keywords.

If the user's voice is input, the control unit 140 detects a beginning and end of the voice utterance of the user within the input voice signal, to thus determine voice segment. The control unit 140 may detect the voice segment by calculating the energy of the input voice signal, dividing the energy levels of the voice signal according to the calculated energies, and implementing dynamic programming. The control unit 140 detects the phoneme, which is the smallest unit of the voice, based on the acoustic model from the voice signal within the detected voice segment and generates phoneme data. The control unit 140 implements a Hidden Markov Model (HMM) on the generated phoneme data to generate text information. However, the method for perceiving a user's voice is not limited to the example explained above. Accordingly, various other methods may be implemented to perceive the user's voice. As a result, the control unit 140 perceives the user's voice contained in the voice signal.

If receiving a motion through the motion input unit 120, the control unit 140 perceives the motion by using the motion recognition module and the motion database. The motion recognition may include perceiving continuous object motions, by distinguishing an image (e.g., successive frames) input through the motion input unit 120 into a background and an object which is subject to the user motion areas (e.g., a user's hand). If the user's motion is input, the control unit 140 stores the received image in units of frames and detects an object by using the stored frames. The control unit 140 detects the object by detecting at least one of shape, color or motion of the object included in the frames. The control unit 140 may trace the detected motion of the object by using the location of the object or the shape of each object respectively included in the plurality of frames.

The control unit 140 determines a user's motion in accordance with the motion of the traced object. By way of example, the control unit 140 determines a user's motion by using at least one of changes in the shape of the object, speed, location and direction of the object. The user's motion may include a grab in which the user clenches his hand, a pointing move in which the user motions to move the indicated cursor by hand, a slap in which the user moves his hand to one direction above a predetermined speed, a shake in which the user waves his hand left/right or up/down, and a rotation in which the user rotates his hand. The technical concept of an exemplary embodiment may be applicable to motions other than those explained above. By way of example, the user's motion may additionally include a spread motion in which the user unfolds his clenched hand and if a hand is in a fixed position for predetermined time, it may be determined as a specific motion.

The control unit 140 determines if the object escapes a certain area (e.g., 40 cm×40 cm square) within a certain time (e.g., 800 ms) to thus determine whether the user's motion is the pointing move or the slap. If the object escapes the certain area within the certain time, the control unit 140 may determine the user's motion to be the slap. In another example, if determining that the speed of the object is below a preset speed (e.g., 30 cm/s), the control unit may determine the user's motion to be the pointing move. If determining that the speed of the object exceeds the preset speed, the control unit 140 determines the user's motion to be the slap.

The control unit 140 performs tasks of the electronic apparatus 100 using the perceived voice and motion. The tasks of the electronic apparatus 100 may include at least one of: power control, channel change, volume adjustment, content (e.g., video, music, photo, etc.) playback, selection of Graphical User Interface (GUI) controls displayed on the screen or Internet service tasks (e.g., search, browsing, etc.), which may be performed by the electronic apparatus 100.

Further, the control unit 140 displays on the display unit 193 the first voice guide information to guide voice command to control the electronic apparatus 100 in the voice task mode. As used herein, the 'voice task mode' is the operation mode in which the electronic apparatus 100 is controlled in accordance with the input user's voice command, following the voice start command which is input into the voice input unit 110. That is, in the voice task mode, once the voice start command is input through the voice input unit 110, the electronic apparatus 100 is controlled in accordance with the input user's voice command. In addition, instead of a voice start command, another type of user command can be used to start the voice task mode. Another type of user command may include an input of a specific button on the remote control, input of a specific button on the electronic apparatus 100, or a user's specific motion, etc.

Then if a user's command to control an external device connected to the electronic apparatus 100 is input, the control unit 140 controls the display unit 193 to change the currently-displayed first voice guide information to second voice guide information. To be specific, a plurality of voice guide information may be stored at the storage unit 130, and the control unit 140 may search the plurality of voice guide information and read out the second voice guide information corresponding to the external device, and display the read second voice guide information on the display unit 193. Several voice guide information correspond to each electronic apparatus 100 and to several external devices connected to electronic apparatus 100. If the voice guide information which a user wishes to use to control an external device is not stored in the storage unit 130, it may be received through the external terminal input unit 160 and/or the network interface 180.

The first and second voice guide information may include different voice commands. By way of example, if the electronic apparatus 100 is a TV, the first voice guide information may include a voice command regarding power control, a voice command regarding operating an external device, a voice command regarding channel setting, or a voice command regarding volume setting. If the external device is one of a DVD player and a BD player, the second voice guide information may include a voice command regarding a TV power control, a voice command regarding an external device power control, a voice command regarding an external device function execution.

To be specific, if the first voice guide information is displayed, and if the voice command included in the first voice guide information is input, the control unit 140 controls the electronic apparatus 100 in accordance with the input voice command.

However, if the second voice guide information is displayed and if the voice command included in the second voice guide information is input through the voice input unit 110, the control unit 140 may generate a control signal corresponding to the input voice command and transmit the generated control signal to the external device via an external terminal input unit 160.

If a relay device which is used for communicating to the electronic apparatus 100 and to the external device exists, and if the voice command included in the second voice guide information is input through the voice input unit 110, the control unit 140 may generate a control signal corresponding to the input voice command and transmit the generated control signal to the external device through the relay device. Herein, the relay device and the electronic apparatus 100 may communicate through the network interface 180, the relay device and the external device may also communicate through a wireless network interface. In this case, the generated control signal may be transmitted from the electronic apparatus 100 to the relay device by Bluetooth communication, and the relay device may be implemented by converting the transmitted control signal into an Infrared (IR) signal and transmit the control signal to the external device. The wireless network interface which is used in communicating the relay device and the external device may include Radio Frequency (RF) communication interface besides the IR communication interface, the RF communication interface may be used Near Field Communication (NFC) communication interface, Zigbee communication interface, and Bluetooth communication interface, etc.

The interface between the relay device and the electronic apparatus 100, and the interface between the relay device and the external device are not limited to the interface described above. These interfaces may be implemented as a wired/wireless communication interface or as various types of two-way communication interfaces. Especially, if an existing interface which is used in external device remote control for communicating between the relay device and the external device is used, it may be used to implement in controlling the external device through a voice command which is input through the electronic apparatus 100 in an exemplary embodiment and a user's motion.

The process of providing the voice guide information depending on the connected external device will be explained in greater detail below with reference to FIGS. 4 to 7.

Figure 2:
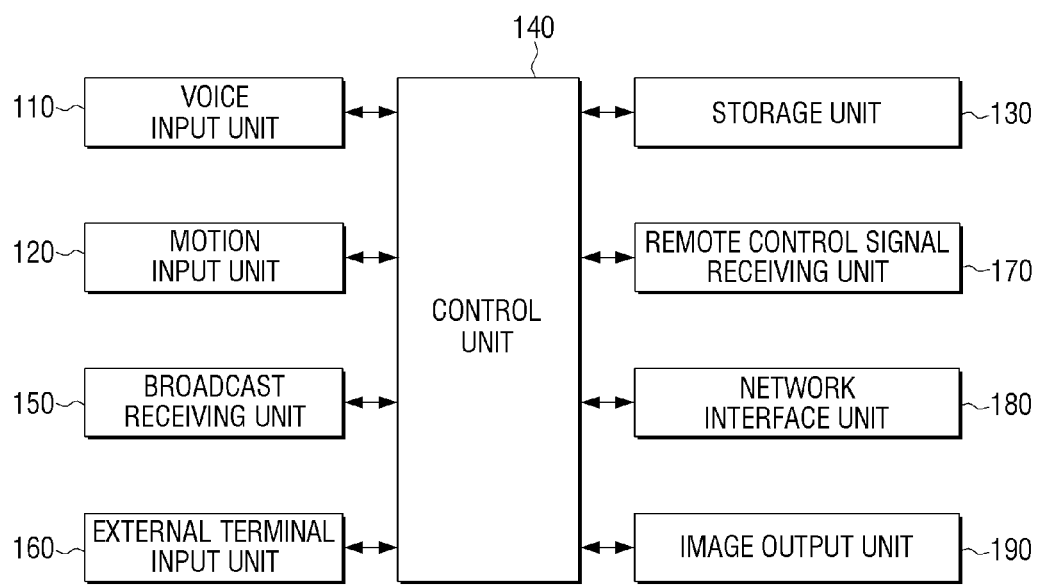

FIG. 2 is a block diagram of the electronic apparatus 100 according to another aspect of an exemplary embodiment. Referring to FIG. 2, the electronic apparatus 100 may include a voice input unit 110, a motion input unit 120, a storage unit 130, a control unit 140, a broadcast receiving unit 150 (e.g., a tuner, a broadcast receiver, etc.), an external terminal input unit 160 (e.g., an external input, etc.), a remote control signal receiving unit 170 (e.g., remote control receiver, etc.), a network interface unit 180 (e.g., a network interface card, etc.), and an image output unit 190 (e.g., an image input device, camera, etc.). Referring to FIG. 2, the electronic apparatus 100 may be implemented as a set-top box, smart TV, etc.

Since the voice input unit 110, the storage unit 130, and the control unit 140 have been explained above with reference to FIG. 1, repetitive explanation thereof will be omitted for the sake of brevity.

The broadcast receiving unit 150 receives an external broadcast signal in a wired or wireless manner. The broadcast signal may include video, audio and additional data (e.g., EPG, metadata, etc.). The broadcast receiving unit 150 may receive the broadcast signal from a variety of types broadcast signals including terrestrial broadcasting, cable broadcasting, satellite broadcasting, or internet broadcasting.

The external terminal input unit 160 may receive image data (e.g., video, photo, etc.) or audio data (e.g., music, etc.) from a source external to the electronic apparatus 100. The external terminal input unit 160 may include at least one of a High-Definition Multimedia Interface (HDMI) input terminal 161, a component input terminal 162, a PC input terminal 163, or a USB input terminal 164. The remote control signal receiving unit 170 may receive a remote control signal from outside the remote controller. The remote control signal receiving unit 170 may receive the remote control signal when the electronic apparatus 100 is in voice task mode or motion task mode. Remote control signal receiving unit 170 may be implemented using a wired or wireless communication interface, or as a one-way or a two-way communication interface.

The network interface unit 180 may connect the electronic apparatus 100 to an external device (e.g., server, another electronic apparatus) under control of the control unit 140. The control unit 140 may control the external device to download an application from the external device connected via the network interface unit 180 to provide an internet service such as web browsing to a user, or to receive image data, audio data, and text data from an external apparatus. The network interface unit 180 may be implemented as a wired or wireless communication interface, or as various types of two-way communication interfaces. For example, the network interface unit 180 may be at least one of Ethernet 181, wireless LAN 182, and Bluetooth 183.

The image output unit 190 may output an external broadcast signal received through the broadcast receiving unit 150, or data input at the external terminal input unit 160, or data stored at the storage unit 130, or data received through the network interface 180 to an external electronic apparatus (e.g., monitor, TV, speaker, etc.). In addition, if the electronic apparatus 100 is equipped with the display or a speaker, etc., the output unit 190 may output through the display or the speaker, etc.

Figure 3:
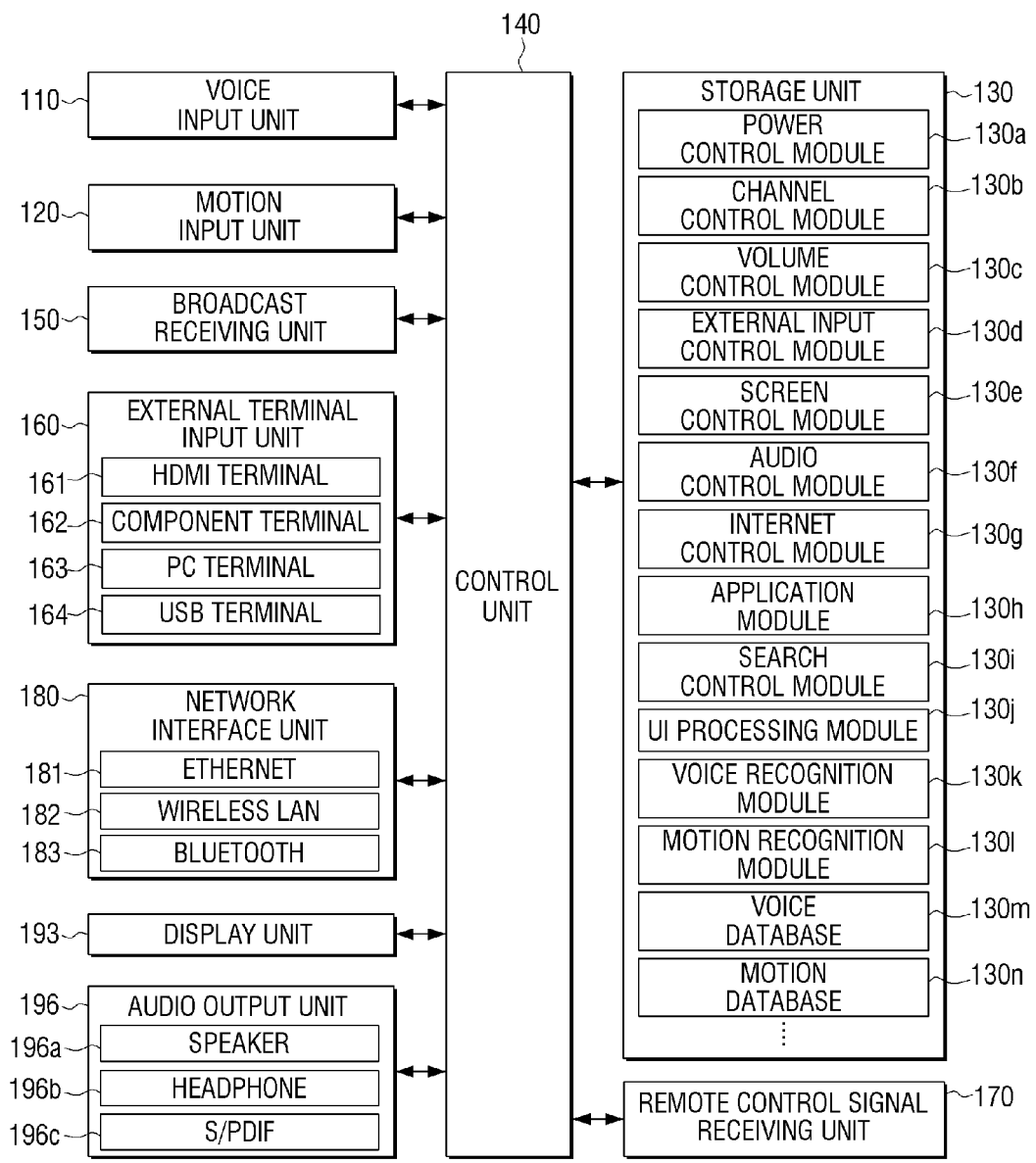

FIG. 3 is a block diagram of the electronic apparatus 100 according to another aspect of an exemplary embodiment. Referring to FIG. 3, the electronic apparatus 100 may include a voice input unit 110, a motion input unit 120, a storage unit 130, a control unit 140, a broadcast receiving unit 150, an external terminal input unit 160, a remote control signal receiving unit 170, a network interface unit 180, a display unit 193 and an audio output unit 196. The electronic apparatus 100 may be a digital TV, but not limited thereto.

Since the voice input unit 110, the motion input unit 120, the storage unit 130, the control unit 140, the broadcast receiving unit 150, the external terminal input unit 160, the remote control signal receiving unit 170, the network interface unit 180, the display unit 193 are identical to those with the same reference numerals explained above with reference to FIGS. 1 and 2, the detailed explanation thereof will be omitted for the sake of brevity.

The audio output unit 196 outputs sound corresponding to the broadcast signal, or outputs sound received through the network interface 180, under control of the control unit 140. The audio output unit 196 (e.g., audio output, speaker, etc.) may include at least one of a speaker 196*a*, a headphone output terminal 196*b* or S/PDIF output terminal 196*c*.

The storage unit 130 may include a power control module 130*a*, a channel control module 130*b*, a volume control module 130*c*, an external input control module 130*d*, a screen control module 130*e*, an audio control module 130*f*, an internet control module 130*g*, an application module 130*h*, a search control module 130*i*, a UI processing module 130*j*, a voice recognition module 130*k*, a motion recognition module 130*l*, a voice database 130*m*, and a motion database 130*n*. The modules 130*a* to 130*n* may be implemented as software to perform the functions of power control, channel control, volume control, external input control, screen control, audio control, internet control, application execution, search control, or UI processing. The control unit 140 may perform a corresponding function by executing the software stored at the storage unit 130.

As explained above, each control module 130*a* to 130*n* may be implemented not only by executing the software stored in the storage unit 130, but also by implementing each in separate hardware.

According to the connected external device, an exemplary embodiment which offers voice guide information will be explained in detail with reference to FIGS. 4 to 7.

Figure 4:
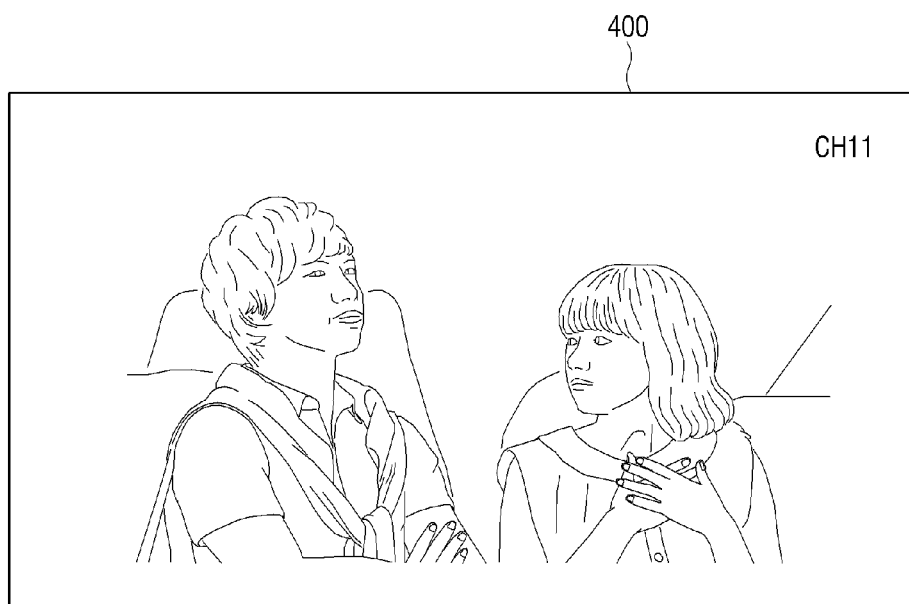
FIGS. 4 to 7 are views provided to illustrate a method for providing different voice guide information depending on an external device connected to the electronic apparatus, according to an exemplary embodiment.

The control unit 140 receives a broadcast signal from an external broadcast station via the broadcast receiving unit 150, and performs signal-processing on the received broadcast signal. Referring to FIG. 4, the control unit 140 then displays the signal-processed broadcast image 400 on the display unit 193 and outputs the signal-processed broadcast sound through the audio output unit 196.

In response to a voice start command input through the voice input unit 110, the control unit 140 perceives the voice start command and thus changes to the voice task mode. As used herein, the 'voice start command' refers to a user command to start the voice task mode in which the electronic apparatus 100 is controlled by the voice command as input to the voice input unit 110. Another type of user command may be used to start the voice task mode in replace of the voice start command. Another type of user command may include input of a specific button on the remote control, input of a specific button on the electronic apparatus 100, a user's specific motion, etc.

Figure 5:
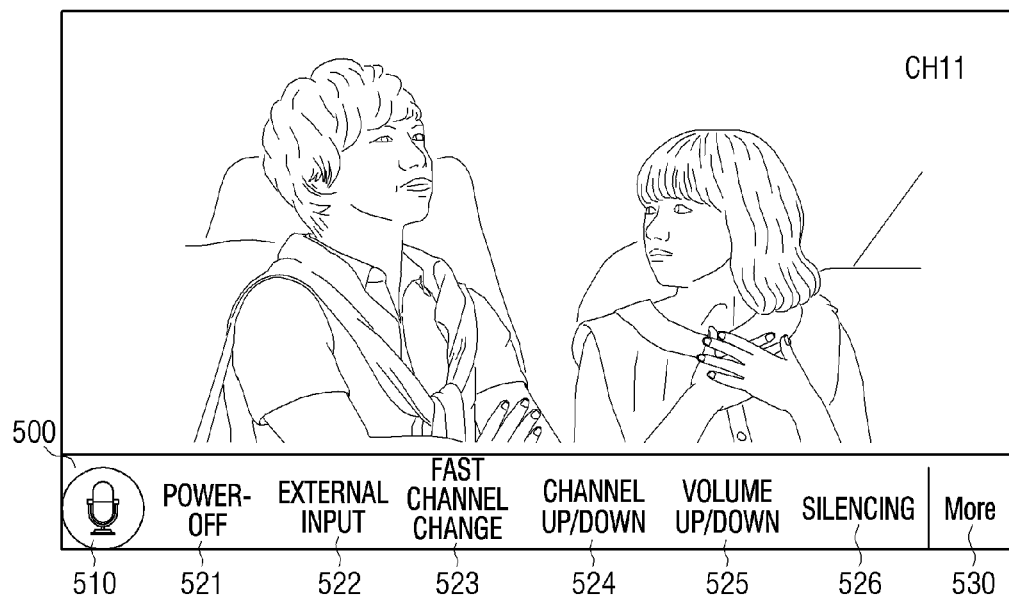

In the voice task mode, the control unit 140 displays first voice guide information 500 to perform the voice task mode (see FIG. 5). The first voice guide information 500 may be displayed on the bottom of the displayed broadcast image. The first voice guide information 500 may include an icon 510 indicating the current mode of the display apparatus to be in voice task mode and a plurality of voice commands 521 to 526, and 530 guiding the user voice commands. The plurality of voice commands may include power-off voice command 521, an external input voice command 522, a fast channel change voice command 523, a channel up/down voice command 524, a volume up/down voice command 525, a silencing voice command 526, and a MORE voice command 530. By using the MORE voice command 530, the user may view more voice commands than those currently displayed. One will understand that, other than the voice commands of the first voice guide information 500 listed above, the voice commands may include additional voice commands (e.g., channel list voice command, etc.).

Figure 6:
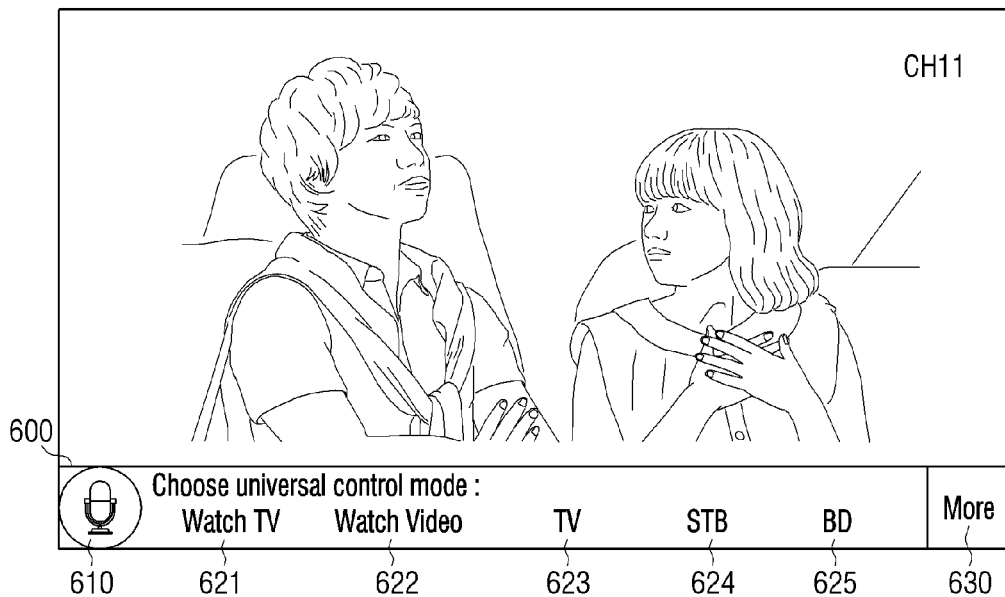

With the first voice guide information displayed, if the voice command "Universal Control" is input into the voice input unit 110, the control unit 140 displays third voice guide information 600 to select the external device to be controlled (see FIG. 6). The third voice guide information 600 may include an icon 610 indicating that the current mode of the display device is voice task mode and a plurality of voice commands 621 to 625, 630 guiding the user's voice. The plurality of voice commands may include Watch TV voice command 621, Watch Video voice command 622, TV voice command 623, set-top box (STB) voice command 624, Blue-ray disk player (BD) voice command 625, and MORE voice command 630. However, one will understand that, other than the voice commands of the third voice guide information 600 listed above, the voice commands may include additional voice commands (e.g., DVD player voice command, USB voice command, etc.).

With the third voice guide information displayed, if a user's voice "BD" is input through the voice input unit 110, the control unit 140 may control the BD by using the user's voice. The control unit 140 then searches the plurality of voice guide information stored in the storage unit 130 for the voice guide information to control the BD, and then displays the voice guide information to control the BD as in FIG. 7.

Figure 7:
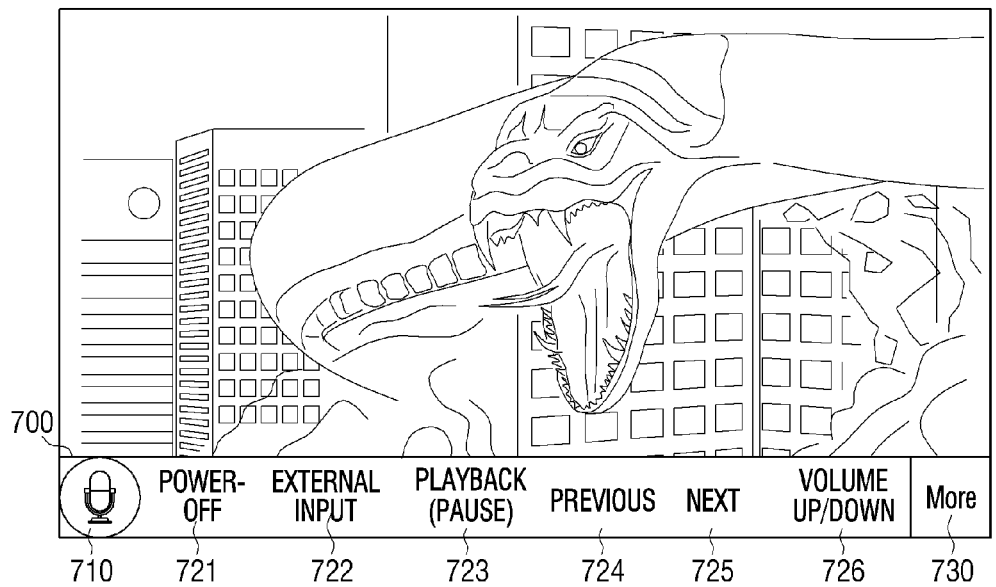

That is, for the broadcast reception, the control unit 140 may display the first voice guide information 500 as illustrated in FIG. 5. However, when selected to external device to be controlled, the control unit 140 changes the displayed voice guide information to the second voice guide information as illustrated in FIG. 7. The second voice guide information 700 includes an icon 710 to indicate that the current mode of the display device is voice task mode, and a plurality of voice commands 721 to 726, 730 to guide the user's voice. The plurality of voice commands include a power-off voice command 721, an external input voice command 722, a playback (pause) voice command 723, a previous file voice command 724, a next file voice command 725, or a volume up/down voice command 726. However, the second voice guide information 700 is not limited to the voice commands listed above. Accordingly, the second voice guide information 700 may include additional voice commands such as fast-forward voice command, rewind voice command, etc.

As explained above, since different voice guide information is provided depending on the type of the selected external device, the user is able to control the electronic apparatus more conveniently and efficiently.

An exemplary embodiment above explains a situation in which the electronic apparatus 100 may select a BD as an external device to be controlled in accordance with the voice command, however this example is only for illustrative purpose. In another aspect of exemplary embodiment, the electronic apparatus 100 may select the BD using a remote control, or the like.

Although it is assumed that different voice guide information is provided in accordance with the type of the selected external device, this is written only for illustrative purpose. Accordingly, different motion guide information may be provided in the motion task mode in accordance with the type of the selected external device.

Figure 8:
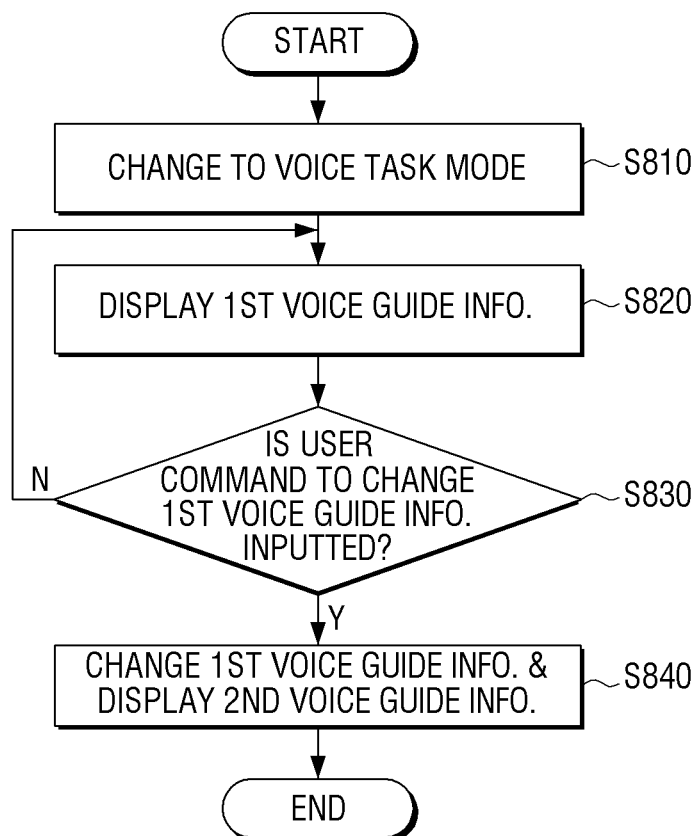
FIG. 8 is a flowchart provided to explain a method for providing different voice guide information depending on an external device connected to the electronic apparatus, according to an exemplary embodiment.

A control method of an electronic apparatus will be explained below with reference to FIG. 8 according to an exemplary embodiment.

The electronic apparatus 100 changes to the voice task mode (S810). Specifically, if a voice start command is input through the voice input unit 110 of the electronic apparatus 100, the electronic apparatus 100 changes the control mode to the voice task mode in which the electronic apparatus 100 is controlled in accordance with the user's voice.

In the voice task mode, the electronic apparatus 100 displays the first voice guide information (S820). To perform broadcast reception, the electronic apparatus 100 may include voice commands to control the broadcast reception function. By way of example, the first voice guide information may include a voice command for channel setting.

The electronic apparatus 100 determines if a user's command to control an external device is input (S830). The user's command may be the user's voice command as explained above with reference to FIG. 6, or a command issued through the external input change buttons provided on the remote control operated in association with the electronic apparatus 100.

If the user's command to control external device is input (S830—Y), the electronic apparatus 100 changes the first voice guide information and thus displays the second voice guide information (S840). In this case, a user can select the type of the external device, and if the external device is Blue-ray (BD) player or DVD player, the voice command for channel setting disappears from the second voice guide information, and voice commands for image playback (e.g., voice command to playback/stop, voice command for next file playback, etc.) may appear. If the user's command is not a command to control external device (S830—N), the first voice guide information remains displayed (S820).

As explained above, since different voice guide information is displayed depending on the type of the selected external device, the user is able to control the connected external device using voice recognition more conveniently and intuitively.

Figure 9:
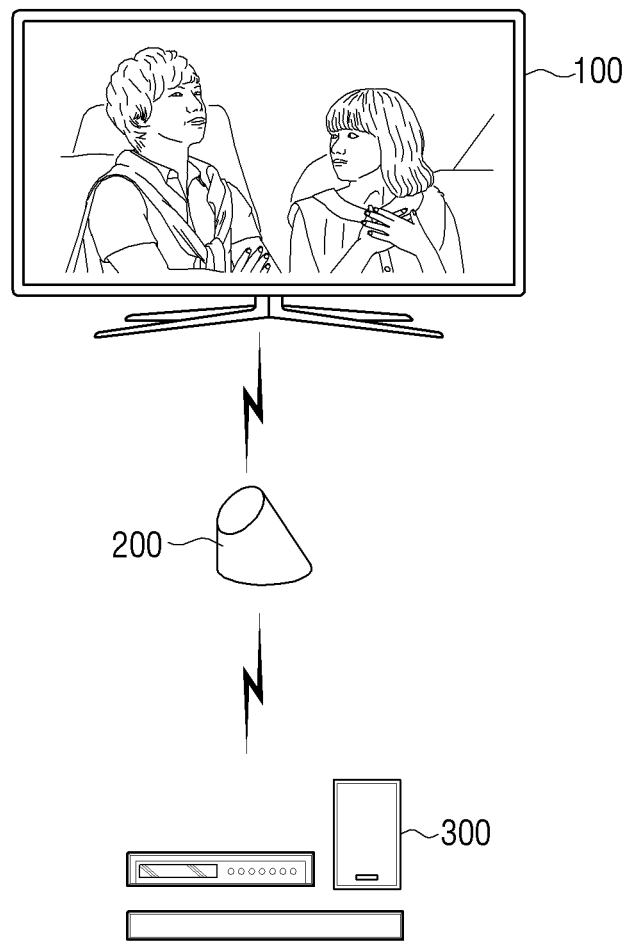
FIG. 9 is a view illustrating a system having an electronic apparatus, an external device, and a relay device relaying the electronic apparatus and the external device, according to an exemplary embodiment.

Although the electronic apparatus 100 is connected directly to the external device through the external terminal input unit 160 in an exemplary embodiment explained above, this example is only illustrative. Accordingly, the technical concept of an exemplary embodiment may also be applicable to an example where not only the electronic apparatus 100 is connected to the external device using a relay device which is connected via the network interface unit 180 but also the electronic apparatus 100 is connected to the external device using both the external terminal input unit 160 and the relay device. To be specific, the system 10 illustrated in FIG. 9 may include the electronic apparatus 100, the relay device 200 and the external device 300, in which the electronic apparatus 100 may be connected to the external device 300 via the relay device 200.

Specifically, if a user's voice, corresponding to the voice command, contained in the second voice guide information is input through the voice input unit 110, the electronic apparatus 100 generates a control signal corresponding to the voice command as input. The electronic apparatus 100 then transmits the control signal to the relay device 200 using the Bluetooth communication of the network interface unit 180. If the control signal is transmitted, the relay device 200 converts the received control signal into IR signal form and transmits the converted signal to the external device 300. On receiving the IR signal, the external device 300 demodulates the IR signal and is controlled in accordance with the voice command input to the electronic apparatus 100.

The interface between the relay device and the electronic apparatus 100, and the interface between the relay device and the external device are not limited to the interfaces described above. These interfaces may be implemented using a wired/wireless communication interface or using various types of two-way communication interfaces.

Program codes executed by a computer or processor to perform a control method according to various exemplary embodiments may be recorded on various types of recording media. Specifically, the program codes may be recorded on a variety of recording media readable on a terminal, such as, RAM (Random Access Memory), Flash memory, ROM (Read Only Memory), EPROM (Erasable Programmable ROM), EEPROM (Electronically Erasable and Programmable ROM), register, hard disk, removable disk, memory card, USB memory, or CD-ROM.

The foregoing embodiments and advantages are merely exemplary and are not to be construed as limiting the inventive concept. The present teachings can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A method for controlling an electronic apparatus, the method comprising:
   displaying a content and first voice guide information indicating voice commands available to control the electronic apparatus;
   receiving a command to display second voice guide information corresponding to a plurality of external devices connected to the electronic apparatus;
   in response to the received command, displaying the second voice guide information including a plurality of voice commands corresponding to the plurality of external devices while the content is displayed;
   receiving a voice command corresponding to an external device of the plurality of external devices; and
   in response to the received voice command, displaying third voice guide information indicating voice commands available to control the external device corresponding to the received voice command while the content is displayed.

2. The method of claim 1, further comprising searching a plurality of voice guide information stored in the electronic apparatus to find the third voice guide information that corresponds to the external device.

3. The method of claim 1, wherein the electronic apparatus is a television, and the first voice guide information comprises at least one of a voice command regarding power control, a voice command regarding operating the external device, a voice command regarding a channel setting, and a voice command regarding a volume setting, and
   wherein the external device is one of a digital versatile disc player and a Blu-ray disc player, the third voice guide information comprises at least one of a voice command regarding power control of the external device, a voice command regarding operating the external device, and a voice command regarding a playback setting of the external device.

4. The method of claim 1, further comprising:
   if the first voice guide information is displayed, and if a first voice command contained in the first voice guide information is received, controlling the electronic apparatus according to the first voice command; and
   if the third voice guide information is displayed, and if a third voice command contained in the third voice guide information is received, generating a control signal corresponding to the third voice command and transmitting the generated control signal to the external device.

5. The method of claim 1, further comprising:
   if the third voice guide information is displayed, and if a voice command corresponding to one of the voice commands included in the third voice guide information is received, generating a control signal corresponding to the voice command; and
   wirelessly transmitting the generated control signal to a relay device which transmits the generated control signal to the external device.

6. The method of claim 5, wherein the generated control signal is transmitted to the relay device by using Bluetooth communication, and
   wherein the relay device converts the transmitted control signal into an infrared (IR) signal and transmits the converted IR signal to the external device.

7. The method of claim 1, wherein the first voice guide information and the second voice guide information each include an icon which indicates that an operation mode of the electronic apparatus is a voice control mode.

8. The method of claim 1, wherein the first guide information and the second voice guide information are displayed on a bottom of a screen on which content is displayed on the electronic apparatus.

9. The method of claim 1, wherein the command is a voice command received through a voice input device to control the external device.

10. An electronic apparatus comprising:
    a voice input unit which receives a command;
    a display; and
    a controller which controls the display to display a content and first voice guide information indicating voice commands available to control the electronic apparatus, in response to receiving a command to display second voice guide information corresponding to a plurality of external devices connected to the electronic apparatus, display the second voice guide information including a plurality of voice commands corresponding to the plurality of external devices while the content is displayed, and in response to a command to select an external device of the plurality of external devices, display third voice guide information indicating voice commands available to control the external device corresponding to the received voice command while the content is displayed.

11. The electronic apparatus of claim 10, further comprising:
    a storage unit which stores a plurality of voice guide information, wherein the controller searches the plurality of stored voice guide information of the storage unit to find the third voice guide information corresponding to the external device.

12. The electronic apparatus of claim 10, wherein the electronic apparatus is a television, and the first voice guide information comprises at least one of a voice command regarding power control, a voice command regarding operating the external device, a voice command regarding a channel setting, and a voice command regarding a volume setting, and
    wherein the external device is one of a digital versatile disc player and a Blu-ray disc player, the third voice guide information comprises at least one of a voice command regarding power control of the external device, a voice command regarding operating the external device, and a voice command regarding a playback setting of the external device.

13. The electronic apparatus of claim 10, further comprising:
    an external terminal input unit which connects the electronic apparatus to the external device, wherein,
    if the first voice guide information is displayed, and if a first voice command contained in the first voice guide information is received, the controller controls the electronic apparatus according to the first voice command, and
    if the third voice guide information is displayed, and if a third voice command contained in the third voice guide information is received, the controller generates a control signal corresponding to the third voice command and transmits the generated control signal to the external device.

14. The electronic apparatus of claim 10, further comprising:
a network interface unit which performs communication with a relay device that communicates with the external device,
wherein if the third voice guide information is displayed, and if a voice command corresponding to one of the voice commands included in the third voice guide information is received, the controller generates a control signal corresponding to the voice command, and wirelessly transmits the generated control signal to the relay device to transmit to the external device.

15. The electronic apparatus of claim 14, wherein the generated control signal is transmitted to the relay device by using Bluetooth communication, and the relay device converts the transmitted control signal into an infrared (IR) signal and transmits the converted IR signal to the external device.

16. The electronic apparatus of claim 10, wherein the first guide information and the second voice guide information each include an icon which indicates that an operation mode of the electronic apparatus is a voice control mode.

17. The electronic apparatus of claim 10, wherein the first guide information and the second voice guide information are displayed on a bottom of a screen on which content is displayed on the electronic apparatus.

18. The electronic apparatus of claim 10, wherein the command is a voice command received through the voice input device to control the external device.

19. A method for controlling a device, the method comprising:
displaying a content and first voice guide information including a plurality of first commands to control the device and a second command to display second voice guide information corresponding to a plurality of external devices connected to the device;
receiving the second command;
in response to receiving the second command, displaying second voice guide information including a plurality of voice commands corresponding to the plurality of external devices while the content is displayed;
receiving a voice command of the plurality of voice commands corresponding to the an external device; and
in response to the received command, displaying third voice guide information indicating voice commands available to control the external device corresponding to the received command while the content is displayed.

* * * * *